(12) United States Patent
Arwatz et al.

(10) Patent No.: US 10,837,813 B2
(45) Date of Patent: Nov. 17, 2020

(54) NANOWIRES INTEGRATION FOR REAL-TIME COMPENSATION

(71) Applicant: THE TRUSTEES OF PRINCETON UNIVERSITY, Princeton, NJ (US)

(72) Inventors: Gilad Arwatz, Princeton, NJ (US); Marcus Hultmark, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 272 days.

(21) Appl. No.: 15/685,721

(22) Filed: Aug. 24, 2017

(65) Prior Publication Data

US 2018/0058889 A1    Mar. 1, 2018

Related U.S. Application Data

(60) Provisional application No. 62/379,531, filed on Aug. 25, 2016.

(51) Int. Cl.
| | | |
|---|---|---|
| G01F 1/66 | (2006.01) | |
| G01F 1/68 | (2006.01) | |
| G01F 1/688 | (2006.01) | |
| G01F 15/02 | (2006.01) | |
| G01F 1/696 | (2006.01) | |
| G01F 1/69 | (2006.01) | |
| G01F 3/36 | (2006.01) | |

(52) U.S. Cl.
CPC .................. *G01F 1/66* (2013.01); *G01F 1/68* (2013.01); *G01F 1/688* (2013.01); *G01F 1/69* (2013.01); *G01F 1/696* (2013.01); *G01F 15/02* (2013.01); *G01F 3/36* (2013.01)

(58) Field of Classification Search
CPC . G01F 1/66; G01F 1/688; G01F 1/696; G01F 1/69; G01F 15/02; G01F 1/68; G01F 3/36
USPC ......................................................... 73/861.01
See application file for complete search history.

(56) References Cited

U.S. PATENT DOCUMENTS

| 5,753,815 A * | 5/1998 | Murata .................... G01F 1/698 73/204.15 |
| 7,591,193 B2 * | 9/2009 | Snell ...................... B82Y 15/00 73/861.85 |
| 2005/0049805 A1 * | 3/2005 | Bonne .................. G01N 27/185 702/57 |

(Continued)

FOREIGN PATENT DOCUMENTS

| JP | 07148485 A * | 6/1995 |
| WO | 2017/116499 | 7/2017 |

OTHER PUBLICATIONS

U.S. Appl. No. 62/379,531, filed Aug. 25, 2016.
Fan, Y., et al. "Nanoscale sensing devices for turbulence measurements." Experiments in Fluids 56.7 (2015): 138.

*Primary Examiner* — Marrit Eyassu
(74) *Attorney, Agent, or Firm* — Sughrue Mion, PLLC

(57) ABSTRACT

A method is provided for measuring at least two flow properties of a fluid. The method includes providing at least two nanowires, the resistance of each nanowire varying based on a value of a different respective flow property such that each nanowire is configured to measure the different respective flow property, and operating each of the nanowires in a different respective mode of operation, in order to measure the at least two flow properties simultaneously in real-time. Other embodiments are also described.

8 Claims, 11 Drawing Sheets

(56) References Cited

U.S. PATENT DOCUMENTS

| | | | |
|---|---|---|---|
| 2008/0066557 A1* | 3/2008 | Yoshida | G01F 1/66 73/861.02 |
| 2008/0184769 A1* | 8/2008 | McKinney | G01F 1/684 73/1.16 |
| 2015/0072800 A1 | 3/2015 | Franklin et al. | |
| 2017/0122892 A1* | 5/2017 | Li | G01N 27/127 |
| 2017/0138799 A1 | 5/2017 | Arwatz et al. | |

* cited by examiner

NANOWIRES INTEGRATION FOR REAL-TIME COMPENSATION

CROSS-REFERENCES TO RELATED APPLICATIONS

The present application claims priority from U.S. Provisional Application No. 62/379,531 to Arwatz et al., filed Aug. 25, 2016, entitled "Nano-wires integration for real-time compensation," which is incorporated herein by reference.

FIELD OF THE INVENTION

The present invention relates to nanowire sensors for sensing fluid flow properties.

BACKGROUND

The resistance of a nanowire varies according to ambient conditions into which the nanowire is placed. A nanowire can therefore be used to measure ambient conditions surrounding the nanowire by driving a current through the nanowire and measuring the varying resistance.

The dissertation of Gilad Arwatz, Ph.D., entitled "Investigations of the fundamentals of passive scalar dynamics using nano-sensing devices," Princeton University, 2015, which is incorporated herein by reference, describes turbulence as being the core of numerous investigations over several decades. Among the wide spectrum of turbulence aspects in the study described in the dissertation, the study focuses on temperature as a passive scalar advected in a turbulent velocity field. In this study, fundamental flow quantities are revisited by investigating statistically homogeneous and isotropic turbulence, with an imposed mean cross-stream linear temperature gradient. This is described as being made possible by developing a new fast response nano-sensor to minimize measurement errors inherent in conventional temperature probes (cold wires). As described in the study, it was observed that cold wire attenuation has widespread effects on most aspects of the measurements, resulting in the variance and the scalar rate of dissipation being significantly underestimated.

Newly acquired data allow for a theoretical study of the temperature spectra, the dissipation range, different scaling laws and intermittencies. By studying the evolution equations of the temperature spectra, conditions for self-preserving solutions were derived and described as being experimentally validated. Self-similarity of the dissipation subrange was explored, and described as revealing that the temperature field can be independently resolved without knowledge of the velocity field. The results are described as raising interesting questions about the underlying behavior of the scalar field, namely local equilibrium versus non-equilibrium.

Based on the proposed scaling and the significant departure of existing models from the expected power-law behavior in the inertial range, a model spectrum was developed based entirely on temperature-related variables, described as showing a convincing agreement with the experimental data in the dissipation range.

The underlying cause of scalar intermittencies, a well-established phenomenon reflected in the exponential tails of the scalar probability density function (PDF), is described as yet to be determined. The interplay between advection and diffusion was investigated through their timescales ratio, following the linear eddy model of Kerstein. The analysis is described as revealing a widening of the PDF as more of the low frequency content is excluded. The development of the new sensor, along with the fundamental study, is described as inspiring new ideas for measuring conductivity as a way to assess humidity in the atmospheric boundary layer or blood damage due to shear stresses. Overall, the study is described as shedding light on the importance of accurate and optimized measurement techniques in the pursuit of understanding turbulence.

An article entitled "Nanoscale sensing devices for turbulence measurements" by Y. Fan et al., which is incorporated herein by reference, describes a collection of nanoscale sensing devices developed specifically for high-frequency turbulence measurements. The sensors are all derived from the nanoscale thermal anemometry probe (NSTAP), which uses a free-standing platinum wire as an active sensing element. Each sensor is described as (a) being designed and fabricated to measure a specific quantity and (b) being customizable for special applications. In addition to the original NSTAP (for single-component velocity measurement), the sensors include the T-NSTAP (for temperature measurement), the x-NSTAP (for two-component velocity measurement), and the q-NSTAP (for humidity measurement). This article provides a summary of the NSTAP family including details of design and fabrication as well as presentation of flow measurements using these sensors. Also, a custom-made constant-temperature anemometer, described as allowing proper operation of the NSTAP sensors, is introduced.

SUMMARY OF THE INVENTION

As described herein, real-time accurate measurements of a flow property of a fluid are obtained with a nanowire sensor by compensating, in real-time, for errors in the measurement that are caused by other turbulent flow properties of the fluid affecting the nanowire. In accordance with some applications of the present invention, at least two nanowires are used to measure at least two different respective flow properties of a fluid, typically simultaneously in real-time. The resistance of each of the nanowires varies based on a different respective flow property, and each of the nanowires is operated in different respective modes of operation, such that the nanowires measure different respective flow properties. The measurements of one of the flow properties are used to correct the measurements of another flow property. For some applications, a first nanowire and a second nanowire are coupled to a Wheatstone bridge such that the varying resistance of the second nanowire affects the first nanowire, thereby correcting the measurement of the first nanowire. Output circuitry outputs the measurement obtained from the first nanowire that is corrected by the measurement obtained from the second nanowire.

For some applications, one nanowire can be used to obtain measurements of different flow properties by alternating the nanowire between different modes of operation. In this case, the resistance of the nanowire varies in response to different flow properties when the nanowire is operated in the different modes of operation respectively. The measurements of one of the flow properties is used to correct the measurements of the other flow property.

There is therefore provided, in accordance with some applications of the present invention, a method for measuring at least two flow properties of a fluid, the method including:

providing at least two nanowires, the resistance of each nanowire varying based on a value of a different respective flow property such that each nanowire is configured to measure the different respective flow property; and operating each of the nanowires in a different respective mode of operation, to measure the at least two flow properties simultaneously in real-time.

For some applications, operating includes operating at least one of the nanowires with constant current anemometry (CCA) and operating at least another of the nanowires with constant temperature anemometry (CTA).

For some applications, providing includes providing at least two nanowires, a first one of the nanowires being configured to measure a flow property of the fluid selected from the group consisting of: temperature, humidity, and velocity.

For some applications, providing includes providing at least two nanowires, a second one of the nanowires being configured to measure another flow property of the fluid selected from the group consisting of: temperature, humidity, and velocity.

For some applications, the method further includes using a measurement obtained from at least one of the nanowires to correct a measurement obtained from at least another of the nanowires.

For some applications:

providing the two nanowires includes providing a temperature-measuring nanowire and a velocity-measuring nanowire, and using a measurement comprises using a temperature measurement obtained from the temperature-measuring nanowire to correct a velocity measurement obtained from the velocity-measuring nanowire.

For some applications, operating includes using an output measurement from a second one of the two nanowires as an offset for a first one of the two nanowires, prior to measurement by the first nanowire.

For some applications, the method further includes driving the first nanowire using first nanowire-driving circuitry and driving the second nanowire using second nanowire-driving circuitry.

For some applications, operating includes using an output measurement from a second one of the two nanowires to process measurement data output by a first one of the two nanowires.

For some applications, the method further includes driving the first nanowire using first nanowire-driving circuitry and driving the second nanowire using second nanowire-driving circuitry.

There is further provided, in accordance with some applications of the present invention, a method for measuring different flow properties of a fluid, the method including:

providing a nanowire, the resistance of the nanowire varying based on values of the different flow properties when operated in different modes of operation respectively, such that the nanowire is configured to measure different flow properties when operated in different modes of operation respectively;

alternating the nanowire between different modes of operation;

measuring different flow properties of the fluid during the different modes of operation, respectively; and using the measurements of one of the flow properties to correct the measurements of another flow property.

For some applications, alternating the nanowire between different modes of operation includes driving the nanowire with different respective levels of current.

For some applications:

alternating the nanowire between different modes of operation includes alternating the nanowire between two different modes of operation, measuring different flow properties includes measuring two different flow properties during the two different modes of operation, respectively, and using the measurements includes using the measurements of one of the flow properties to correct the measurements of the other flow property.

For some applications, alternating the nanowire between the two different modes of operation includes driving the nanowire with an alternating current.

For some applications, measuring two different flow properties of the fluid includes measuring the two different flow properties at a measurement frequency of less than half of a frequency of the alternating current.

For some applications, driving the nanowire with the alternating current includes driving the nanowire with an alternating current having a frequency of 1-2000 Hz.

For some applications, driving the nanowire with the alternating current includes driving the nanowire with an alternating current having a frequency of 1-100 Hz.

For some applications, driving the nanowire with the alternating current includes driving the nanowire with an alternating current having a frequency of 100-2000 Hz.

For some applications, driving the nanowire with an alternating current includes driving the nanowire with an alternating current in a form selected from the group consisting of: a square wave, a triangle wave, or a sinusoidal wave.

For some applications:

alternating the nanowire between the two different modes of operation includes using a switching circuit to switch between the two modes of operation, and using the measurements of one of the flow properties to correct the measurements of the other flow property includes processing data output by the nanowire after two different flow properties have been measured.

For some applications, using a switching circuit to switch between the two modes of operation includes using a switching circuit to switch between operating the nanowire with constant current anemometry (CCA) and operating the nanowire with constant temperature anemometry (CTA).

For some applications, using a switching circuit to switch between the two modes of operation includes using a switching circuit to switch between operating the nanowire using two different constant current anemometry (CCA) circuits.

For some applications, using the switching circuit to switch between operating the nanowire using two different CCA circuits includes using a switching circuit to switch between operating the nanowire using a first CCA circuit that drives the nanowire with a current of 5-50 mA and a second CCA circuit that drives the nanowire with a current of 0.1-1 mA.

There is further provided, in accordance with some applications of the present invention, apparatus for measuring flow properties of a fluid, the apparatus including:

a Wheatstone bridge;

a first nanowire coupled along a first leg of the Wheatstone bridge, the first nanowire being configured to measure a first flow property;

a power source configured to supply power to the Wheatstone bridge;

a second nanowire coupled to the Wheatstone bridge or to the power source; and output circuitry, configured to output a measurement obtained from the first nanowire that is corrected by a measurement obtained from the second nanowire.

For some applications, the first nanowire is configured to measure a flow property selected from the group consisting of:

temperature, humidity, and velocity.

For some applications:

the selected flow property is temperature, a longitudinal length of the first nanowire is 60-250 microns, a width of a cross-section of the first nanowire, the cross-section being taken perpendicular to a direction of current flow in the nanowire, is 1-2 microns, and a height of the cross-section of the first nanowire is 0.1-0.2 microns.

For some applications:

the selected flow property is velocity, a longitudinal length of the first nanowire is 30-100 microns, a width of a cross-section of the first nanowire, the cross-section being taken perpendicular to a direction of current flow in the nanowire, is 1-2 microns, and a height of the cross-section of the first nanowire is 0.1-0.2 microns.

For some applications:

the selected flow property is humidity, a longitudinal length of the first nanowire is 10-60 microns, a width of a cross-section of the first nanowire, the cross-section being taken perpendicular to a direction of current flow in the nanowire, is 0.1-1 microns, and a height of the cross-section of the first nanowire is 0.05-0.1 microns.

For some applications, the second nanowire is configured to measure another flow property selected from the group consisting of: temperature, humidity, and velocity.

For some applications:

the other flow property is temperature, a longitudinal length of the second nanowire is 60-250 microns, a width of a cross-section of the second nanowire, the cross-section being taken perpendicular to a direction of current flow in the nanowire, is 1-2 microns, and a height of the cross-section of the second nanowire is 0.1-0.2 microns.

For some applications:

the other flow property is velocity, a longitudinal length of the second nanowire is 30-100 microns, a width of a cross-section of the second nanowire, the cross-section being taken perpendicular to a direction of current flow in the nanowire, is 1-2 microns, and a height of the cross-section of the second nanowire is 0.1-0.2 microns.

For some applications:

the other flow property is humidity, a longitudinal length of the second nanowire is 10-60 microns, a width of a cross-section of the second nanowire, the cross-section being taken perpendicular to a direction of current flow in the nanowire, is 0.1-1 microns, and a height of the cross-section of the second nanowire is 0.05-0.1 microns.

For some applications, a longitudinal length of the second nanowire is 0.6-9 times a longitudinal length of the first nanowire.

For some applications, the longitudinal length of the second nanowire is 1-3 times the longitudinal length of the first nanowire.

For some applications, a ratio of a width to a height of a cross-section of the first nanowire is 0.8-1.2 times a ratio of a width to a height of a cross-section of the second nanowire, the cross-sections being taken perpendicular to a direction of current flow in the first and second nanowires.

For some applications, a volume of the first nanowire is 0.8-1.2 times a volume of the second nanowire.

For some applications, a volume of the second nanowire is 4-1000 times a volume of the first nanowire.

For some applications, the volume of the second nanowire is 15-180 times the volume of the first nanowire.

For some applications, the second nanowire is coupled in series with the Wheatstone bridge, the second nanowire being disposed between the power source and the Wheatstone bridge, such that a voltage supplied to the Wheatstone bridge is altered according to a resistance of the second nanowire that varies based on a value of the second flow property.

For some applications, the second nanowire is coupled in parallel to the Wheatstone bridge such that a current supplied to the Wheatstone bridge is altered according to a resistance of the second nanowire that varies based on a value of the second flow property.

For some applications, the second nanowire is coupled along a second leg of the Wheatstone bridge.

For some applications, the apparatus further includes matching circuitry coupled to the second nanowire and configured to regulate a current flowing through the second nanowire.

For some applications, the first nanowire is configured to measure humidity and is sensitive to velocity as well, and the second nanowire is configured to measure velocity, the apparatus further comprising matching circuitry configured to tune the second nanowire such that a velocity sensitivity of the second nanowire matches the velocity sensitivity of the first nanowire.

For some applications:

(a) the first and second nanowires are configured to measure velocity of the fluid and are sensitive to temperature as well, and (b) the first nanowire is disposed such that it is exposed to the velocity of the fluid and the second nanowire is disposed such that it is shielded from the velocity of the fluid.

For some applications, the second nanowire is disposed such that an angle between the second nanowire and a flow field of the fluid is less than 20 degrees.

For some applications, the second nanowire is disposed such that it is parallel to the flow field of the fluid.

For some applications, apparatus further includes a porous structure positioned to limit the velocity of the fluid within the porous structure, the second nanowire being disposed inside the porous structure.

For some applications, the apparatus further includes a porous structure positioned to limit the velocity of the fluid at the second nanowire.

For some applications, the apparatus further includes a chamber in which the second nanowire is disposed, the chamber being shaped to define exactly one opening which allows ambient fluid temperature conditions to affect the second nanowire without facilitating a fluid-motion-inducing pressure differential within the chamber.

For some applications, a diameter of the exactly one opening is 0.1-1 mm.

The present invention will be more fully understood from the following detailed description of applications thereof, taken together with the drawings, in which:

DETAILED DESCRIPTION

Figure 1:
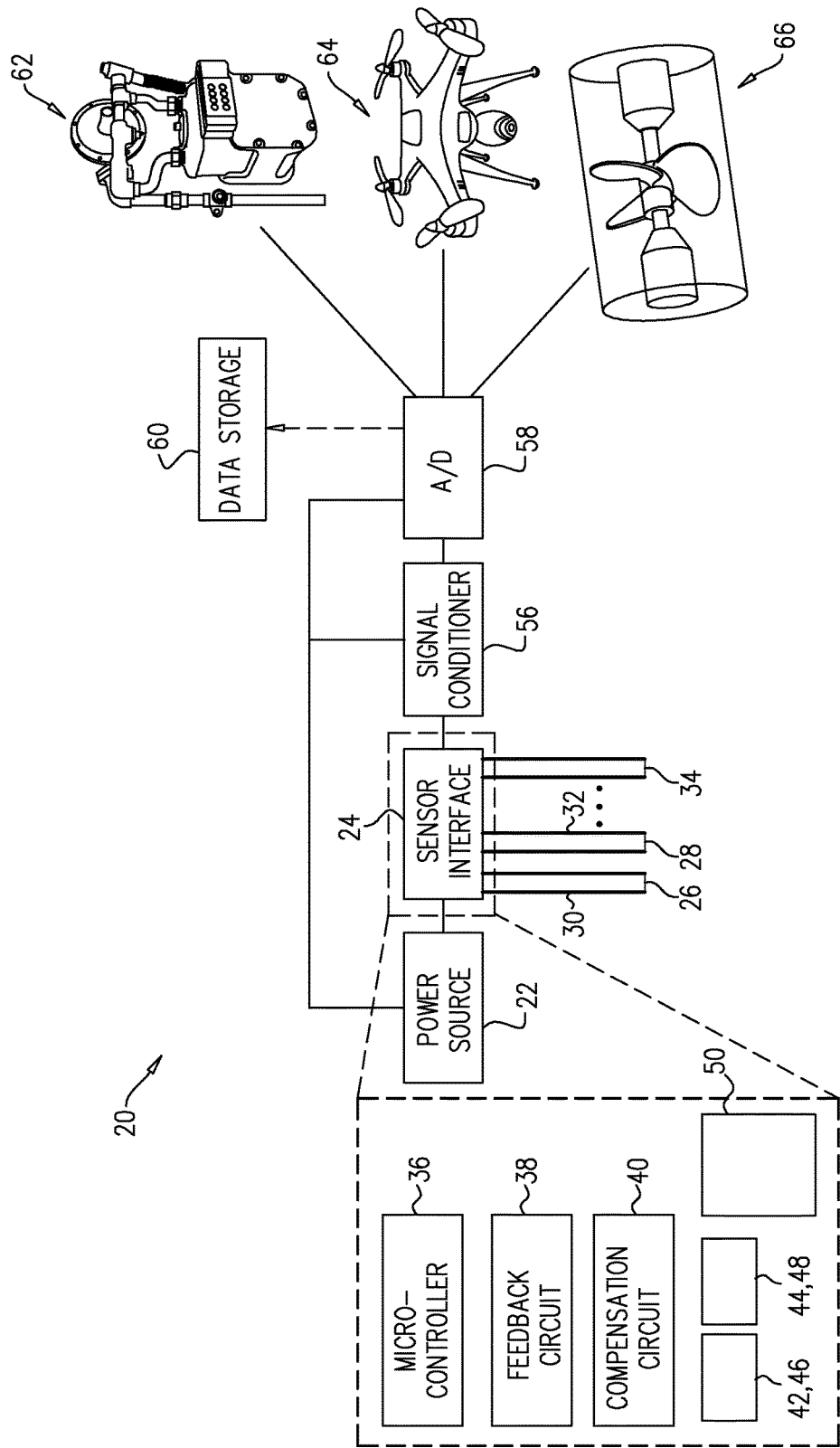
FIGS. 1-4 are schematic illustrations of sensing apparatus in accordance with some applications of the present invention.

Flow properties of a fluid include temperature of the fluid, humidity, and velocity of the fluid. Nanowires of different dimensions exhibit different sensitivities to each of the abovementioned flow properties respectively, the resistance of each nanowire varying based on the respective flow property that the nanowire is sensitive to. Different nanowires can therefore be configured to measure different flow properties respectively.

For some applications, a nanowire that is configured to measure temperature has the following dimensions:
  a longitudinal length of the nanowire is 60-250 microns,
  a width of a typically but not necessarily rectangular cross-section of the nanowire is 1-2 microns, the cross-section being taken perpendicular to a direction of current flow in the nanowire, and
  a height of the cross-section of the nanowire is 0.1-0.2 microns.

For some applications, a nanowire that is configured to measure velocity typically has the following dimensions:
  a longitudinal length of the nanowire is 30-100 microns,
  a width of a typically but not necessarily rectangular cross-section of the nanowire is 1-2 microns, the cross-section being taken perpendicular to a direction of current flow in the nanowire, and
  a height of the cross-section of the nanowire is 0.1-0.2 microns.

For some applications, a nanowire that is configured to measure humidity typically has the following dimensions:
  a longitudinal length of the nanowire is 10-60 microns,
  a width of a typically but not necessary rectangular cross-section of the nanowire is 0.1-1 microns, the cross-section being taken perpendicular to a direction of current flow in the nanowire, and
  a height of the cross-section of the nanowire is 0.05-0.1 microns.

The sensitivity of a nanowire to the different abovementioned fluid flow properties is based on the general principle that resistance of a nanowire changes with temperature. When the nanowire is cool, its resistance varies with changes in the ambient fluid temperature, thus the nanowire can be used to measure the ambient fluid temperature. When the nanowire is heated, it becomes sensitive to heat transfer from the ambient environment. Depending on the Peclet number, a dimensionless parameter that is a function of both the nanowire dimensions and flow parameters of the fluid, the heated nanowire is more sensitive to either (a) heat transfer by thermal conduction, which translates to a humidity measurement, or (b) heat transfer by convection, which translates to a velocity measurement. For heat transfer, the Peclet number Pe is defined as $$Pe = LU/\text{alpha},\qquad\text{[Equation 1]}$$

where L is the longitudinal length of the nanowire, U is the local flow velocity, and alpha is the thermal diffusivity of the fluid. Thus, a heated nanowire can be used to measure humidity or velocity of the fluid depending on the Peclet number.

However, a nanowire configured to measure a specific flow property of the fluid will still be affected to some degree by other flow properties of the fluid. The ability to compensate for effects caused by these other flow properties increases the accuracy of the measurement of the specific flow property being measured. For example, as described herein, the accuracy of a measurement of humidity may be increased by compensating for velocity effects on the nanowire, and the accuracy of a measurement of velocity may be increased by compensating for any temperature effects on the nanowire.

For some applications, real-time compensation is achieved by using at least two nanowires that are configured to measure different flow properties, such as temperature, humidity, or velocity, respectively, i.e., the resistance of each nanowire varies based on a value of a different respective flow property. The nanowires are operated in different respective modes of operation. For example, one of the nanowires may be operated with constant current anemometry (CCA) and another of the nanowires may be operated with constant temperature anemometry (CTA). A measurement obtained from one of the nanowires is used to correct a measurement obtained from another of the nanowires. For some applications, the measurements are made simultaneously in order to provide real-time compensation. For other applications, such as in a slow-changing or non-changing flow field, compensation can be performed without simultaneous measurements of the two flow properties.

As used in the present application, including in the claims, simultaneous measurements are to be understood as follows: when data are being measured at a measurement frequency f, simultaneous measurements are measurements taken in the same cycle, with a time interval between each measurement being less than 1/f seconds. Alternatively to simultaneously, measurements may be taken at time intervals of 5/f seconds.

As used in the present application, including in the claims, correcting a measurement is to be understood as increasing the accuracy of the measurement.

Reference is now made to FIG. 1, which is a schematic illustration of sensing apparatus in accordance with some applications of the present invention. For some applications, sensing apparatus 20 is provided. A power source 22 drives a sensor interface 24. At least two nanowires 26 and 28, e.g., held by probes 30 and 32 respectively, are coupled to sensor interface 24. Optionally, additional nanowires 34 may be coupled to sensor interface 24. Sensor interface 24 operates the nanowires and performs the compensation using a plurality of components, such as a micro-controller 36, a feedback circuit 38, a compensation circuit 40, first nanowire-driving circuitry 42, and/or second nanowire-driving circuitry 44. First nanowire-driving circuitry 42 and second nanowire-driving circuitry 44 may be CCA circuitry 46 and CTA circuitry 48 respectively. Alternatively, first nanowire-driving circuitry 42 and second nanowire-driving circuitry 44 may be CTA circuitry 46 and CCA circuitry 48 respectively.

For some applications, sensor interface 24 performs the compensation by using an output measurement from a second one of the two nanowires, e.g., nanowire 28, as an offset for a first one of the two nanowires, e.g., nanowire 26, prior to measurement by first nanowire 26. Alternatively or additionally, sensor interface 24 further includes a processing unit 50, that uses an output measurement from second nanowire 28 to process measurement data output by first nanowire 26.

For example, second nanowire 28 may be a temperature-measuring nanowire, and first nanowire 26 may be a velocity-measuring nanowire. Sensor interface 24 uses a temperature measurement obtained from the temperature-measuring nanowire to correct a velocity measurement obtained from the velocity-measuring nanowire.

Sensor interface 24 outputs the corrected measurements to a signal conditioner 56, which outputs data to an analog-to-digital (A/D) converter 58. The digital data may be stored in data storage 60, and/or be sent as real-time feedback to a device, such as, for example, a gas meter 62, a multicopter 64, or a turbine 66, further described hereinbelow.

Figure 2:
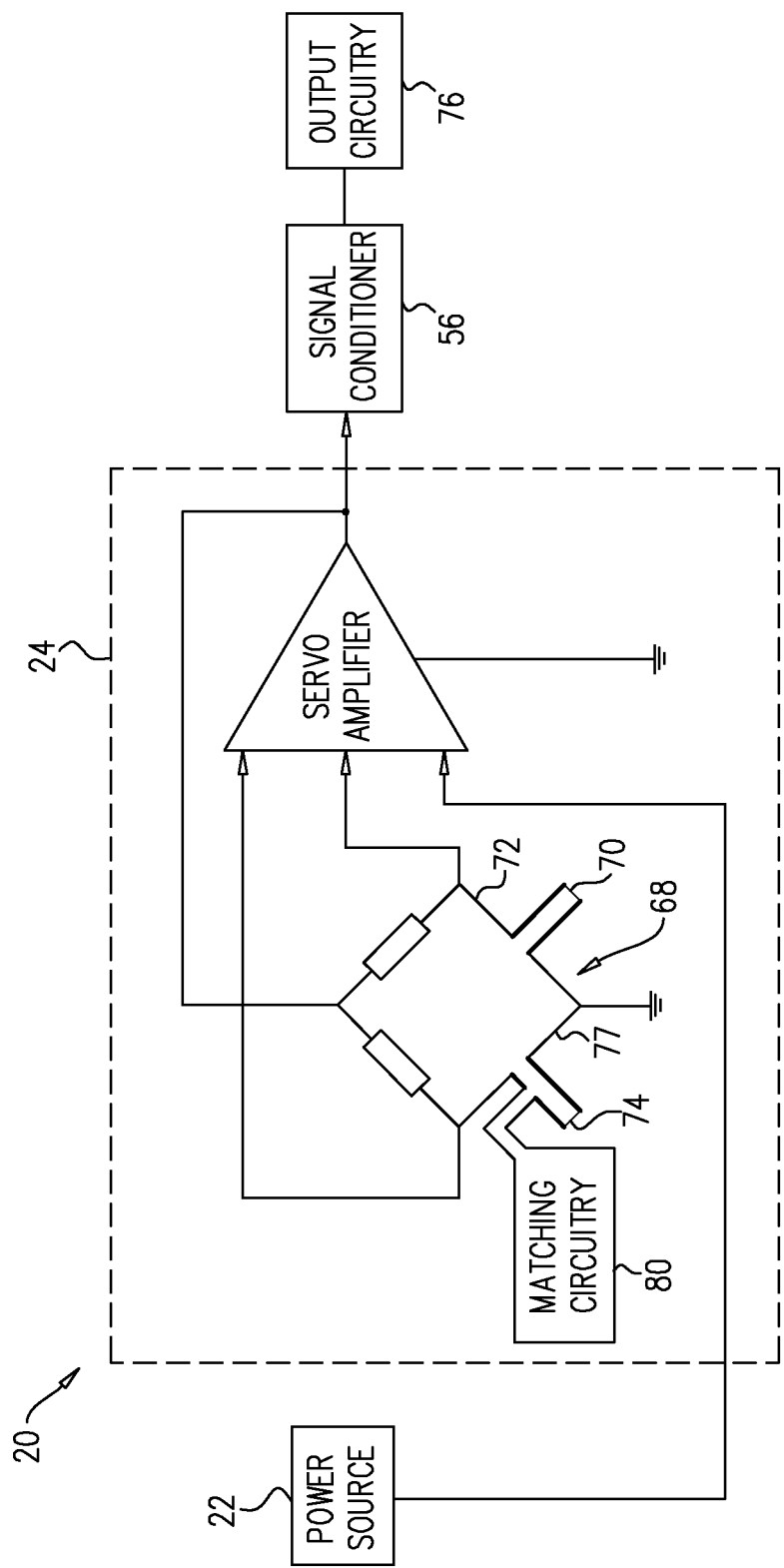
Figure 3:
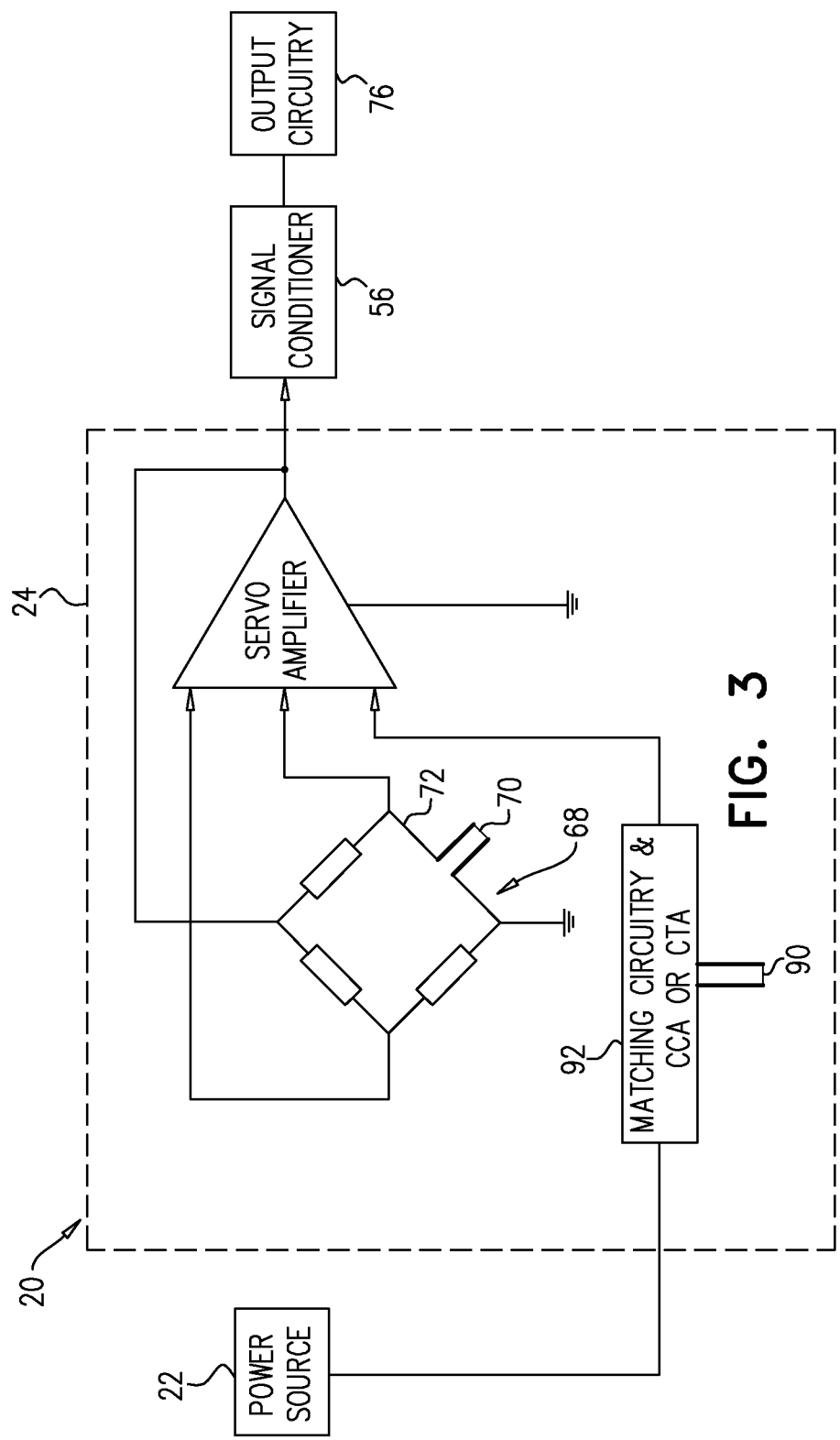
Figure 4:
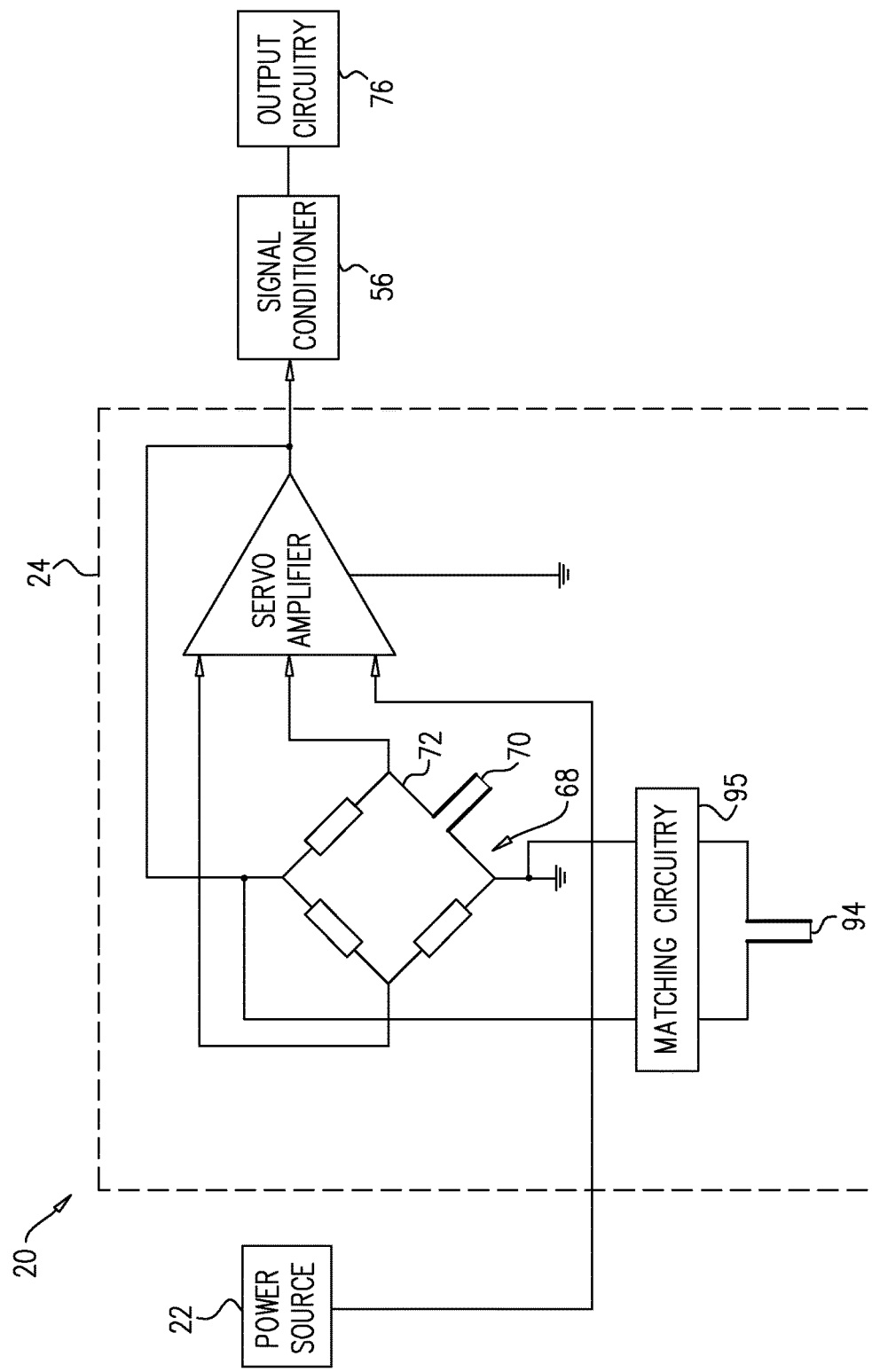

Reference is now made to FIGS. 2-4, which are schematic illustrations of sensing apparatus 20 in accordance with some applications of the present invention. For some applications, the circuitry inside sensor interface 24 includes a Wheatstone bridge 68. A first nanowire 70 is coupled along a first leg 72 of Wheatstone bridge 68, and a second nanowire 74 is coupled either to Wheatstone bridge 68 or to power source 22. Second nanowire 74 acts as a compensating nanowire, further described hereinbelow. Signal conditioner 56 sends data to output circuitry 76, such as A/D converter 58 (FIG. 1), that outputs a measurement obtained by first nanowire 70 that is corrected by a measurement obtained from second nanowire 74. First nanowire 70 and second nanowire 74 are configured to measure different flow properties of a fluid respectively, such as temperature, humidity, and velocity as described hereinabove. It is noted that use of a Wheatstone bridge in the circuitry is provided as an example, and the scope of the present invention includes other circuitry known in the art for measuring resistance.

FIG. 2 shows second nanowire 74 coupled along a second leg 77 of Wheatstone bridge 68. First nanowire 70 is configured to measure a first flow property but the resistance of first nanowire 70 may also be affected by a second flow property. Second nanowire 74 is configured to measure the second flow property, but substantially not the first flow property. Matching circuitry 80, coupled to second nanowire 74 is configured (a) to maintain a nominal resistance of second nanowire 74 such that the overheat ratio of Wheatstone bridge 68 stays between 1.1 and 1.5, and (b) to regulate the current flowing through second nanowire 74. An imbalance of resistance between the two legs of Wheatstone bridge 68 is referred to as the overheat ratio. The nominal resistance of second nanowire 74 is the combined resistance of second nanowire 74 and matching circuitry 80 at an initial time t0 before measurements are taken. A change in the second flow property affects the resistance of both first nanowire 70 and second nanowire 74 typically to substantially the same degree, and therefore does not cause a differential voltage across Wheatstone bridge 68, while a change in the first flow property affects the resistance of substantially only first nanowire 70, causing a differential voltage across the Wheatstone bridge that is detected, processed, and output as a corrected measurement of the first flow property.

For some applications, first nanowire 70 is a humidity-measuring nanowire that is also sensitive to velocity of the fluid, and second nanowire 74 is a velocity-measuring nanowire. In this case, matching circuitry 80, coupled to second nanowire 74, (a) maintains the nominal resistance of the velocity-measuring nanowire such that the overheat ratio in Wheatstone bridge 68 stays between 1.1 and 1.5, and (b) regulates the current flowing through second nanowire 74 in order to tune a velocity sensitivity of second nanowire 74 to match the velocity sensitivity of first nanowire 70. Changes in heat transfer from the fluid by convection, i.e., changes in velocity of the fluid, typically affect the resistance of both first nanowire 70 and second nanowire 74 to substantially the same degree, whereas changes in heat transfer from the fluid by conduction, i.e., changes in humidity of the fluid, affect the resistance of substantially only first nanowire 70. Therefore, second nanowire 74 compensates the measurement of humidity measured by first nanowire 70 for any changes in velocity of the fluid.

For some applications, first nanowire 70 is a humidity-measuring nanowire that is also sensitive to temperature, and second nanowire 74 is a temperature-measuring nanowire. In this case, matching circuitry 80, coupled to second nanowire 74, (a) maintains the nominal resistance of the temperature-measuring nanowire such that the overheat ratio in Wheatstone bridge 68 stays between 1.1 and 1.5, and (b) keeps the current flowing through second nanowire 74 low enough for it to be a temperature-measuring nanowire. A change in the ambient fluid temperature will affect the resistance of both first nanowire 70 and second nanowire 74 to substantially the same degree, whereas changes in humidity of the fluid affect the resistance of substantially only first nanowire 70. Therefore, second nanowire 74 compensates the measurement of humidity by first nanowire 70 for any changes in ambient fluid temperature.

For some applications, first nanowire 70 is a velocity-measuring nanowire that is sensitive to temperature as well, and second nanowire 74 is a temperature-measuring nanowire. In this case, matching circuitry 80, coupled to second nanowire 74, (a) maintains the nominal resistance of the temperature-measuring nanowire such that the overheat ratio in Wheatstone bridge 68 stays between 1.1 and 1.5, and (b) keeps the current flowing through second nanowire 74 low enough for it to be a temperature-measuring nanowire. A change in the ambient fluid temperature will affect the resistance of both first nanowire 70 and second nanowire 74 to substantially the same degree, whereas changes in velocity of the fluid affect the resistance of substantially only first nanowire 70. Therefore, second nanowire 74 compensates the measurement of velocity by first nanowire 70 for any changes in ambient fluid temperature.

For some applications, first nanowire 70 and second nanowire 74 are both velocity-measuring nanowires that are sensitive to temperature as well. In this case, first nanowire 70 is disposed such that it is exposed to the velocity of the fluid, and second nanowire 74 is disposed such that it is generally shielded from the velocity of the fluid, and thus only exposed to the temperature. A change in temperature therefore affects both first nanowire 70 and second nanowire 74, to substantially the same degree, whereas changes in velocity affect substantially only first nanowire 70. Therefore, second nanowire 74 compensates the measurement of velocity measured by first nanowire 70 for any changes in temperature of the fluid.

Figure 5A:
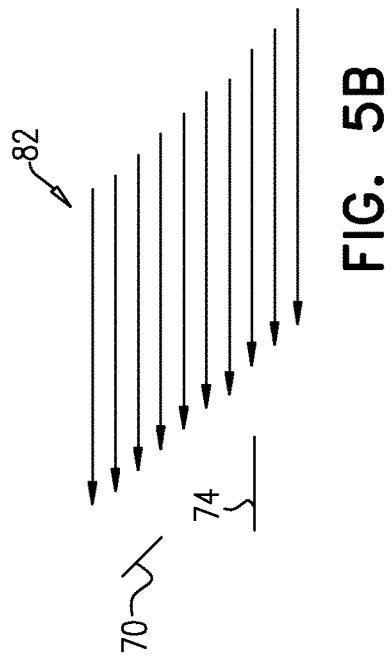
FIGS. 5A-D are schematic illustrations of a fluid flow field with two nanowires in the flow field, in accordance with respective applications of the present invention.
Figure 5B:
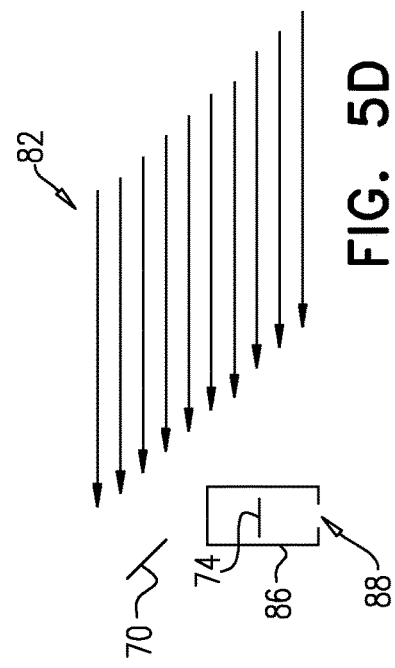
Figure 5C:
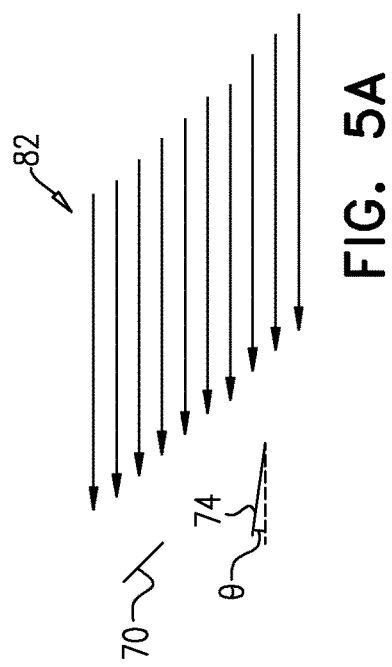
Figure 5D:
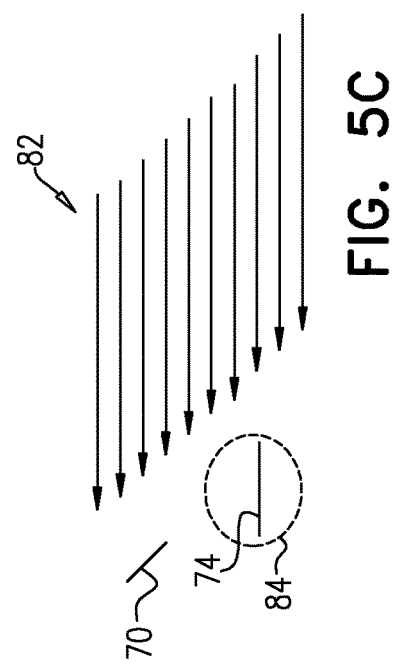

Reference is now made to FIGS. 5A-D, which are schematic illustrations of a velocity flow field and two nanowires in the field, in accordance with respective applications of the present invention. For some applications, such as is shown in FIGS. 5A-B, second nanowire 74 is shielded from a velocity flow field 82 by being disposed such that an angle theta between second nanowire 74 and flow field 82 is less than 20 degrees, e.g., second nanowire 74 may be parallel to velocity flow field 82. For some applications, such as is shown in FIG. 5C, second nanowire 74 is shielded from velocity flow field 82 by a porous structure 84. Porous structure 84 prevents second nanowire 74 from being affected by the velocity of the fluid, while still allowing second nanowire 74 to be affected by ambient fluid temperature. For some applications, second nanowire 74 may be disposed inside porous structure 84. For some applications, such as is shown in FIG. 5D, second nanowire 74 may be shielded from velocity flow field 82 by being disposed in a chamber 86 that is shaped to define exactly one opening 88, having a diameter of 0.1-1 mm. Opening 88 allows ambient fluid temperature conditions to affect second nanowire 74 without facilitating a pressure differential that would cause fluid motion within chamber 86.

Reference is now made to FIG. 3, which is a schematic illustration of sensing apparatus 20 in accordance with some applications of the present invention. For some applications, first nanowire 70 is coupled to first leg 72 of Wheatstone bridge 68, and a second nanowire 90, operated by its own nanowire-driving circuit 92, e.g., matching circuitry along with either a CCA circuit or a CTA circuit, is coupled in series to power source 22, between power source 22 and Wheatstone bridge 68. First nanowire 70 is configured to measure a first flow property, and second nanowire 90 is typically configured to measure a second flow property. Compensation is performed by the voltage supplied by power source 22 to Wheatstone bridge 68, and therefore to first nanowire 70, being altered according to a resistance of second nanowire 90, the resistance of second nanowire 90 varying based on the value of the second flow property. For some applications, second nanowire 90 may be a velocity-measuring nanowire that is shielded from the velocity of the fluid, such as described above with reference to FIG. 2 and FIG. 5.

Reference is now made to FIG. 4, which is a schematic illustration of sensing apparatus 20 in accordance with some applications of the present invention. For some applications, first nanowire 70 is coupled to first leg 72 of Wheatstone bridge 68, and a second nanowire 94 is coupled in parallel to Wheatstone bridge 68. First nanowire 70 is configured to measure a first flow property, and second nanowire 94 is typically configured to measure a second flow property. Compensation is performed by the current supplied to Wheatstone bridge 68, and therefore to first nanowire 70, being altered according to a resistance of second nanowire 94, resistance of second nanowire 94 varying based on the value of the second flow property. Matching circuitry 95 regulates the current flowing through second nanowire 94, thereby regulating the current flowing through first nanowire 70. The total amount of resistance in matching circuitry 95 and second nanowire 94 determines how much current flows through Wheatstone bridge 68, and therefore through first nanowire 70. For some applications, second nanowire 94 may be a velocity-measuring nanowire that is shielded from the velocity of the fluid, such as described above with reference to FIG. 2 and FIG. 5.

For some applications, such as when the first nanowire is a velocity-measuring nanowire and the compensating second nanowire is a temperature-measuring nanowire, the longitudinal length of the second nanowire is 0.6-9, e.g., 1-3, times the longitudinal length of the first wire. The respective cross-sectional areas of the velocity-measuring nanowire and the compensating temperature-measuring nanowire may be similar to each other, e.g., the same as each other. Alternatively or additionally, (a) a ratio of the width to the height of the cross-section of the first nanowire is typically 0.8-1.2 times (b) a ratio of the width to the height of the cross-section of the second nanowire, the cross-sections being taken perpendicular to a direction of current flow in the nanowires.

For some applications, such as when the first nanowire and the compensating second nanowire are velocity-measuring nanowires (e.g., as described hereinabove with reference to FIGS. 5A-D), the two nanowires may be similar in size, e.g., the same size, such that a volume of the first nanowire is 0.8-1.2 times a volume of the second nanowire.

For some applications, such as when the first nanowire is a humidity-measuring nanowire and the compensating second nanowire is a velocity-measuring nanowire, the second nanowire is substantially larger than the first nanowire. For example, a volume of the second nanowire may be 4-1000, e.g., 15-180, times a volume of the first nanowire.

Figure 6:
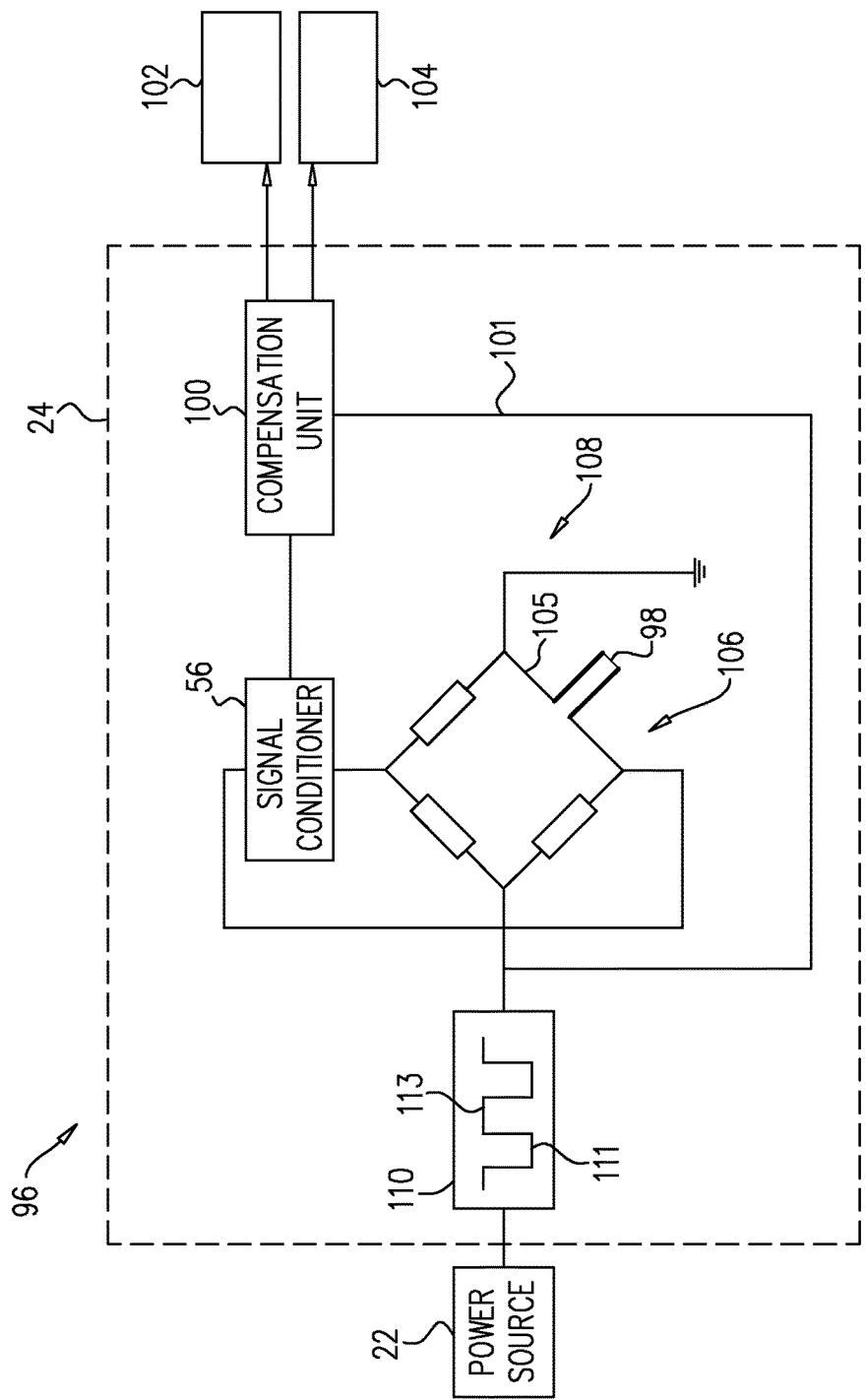
FIG. 6-8 are schematic illustrations of the sensing apparatus in accordance with some applications of the present invention.

Reference is now made to FIG. 6, which is a schematic illustration of sensing apparatus in accordance with some applications of the present invention. For some applications, sensing apparatus 96 is provided. In sensing apparatus 96 a single nanowire 98 is used to measure different flow properties by alternating nanowire 98 between at least two different modes of operation (which is unlike sensing apparatus 20 described hereinabove in which two nanowires are used, each being operated in a different respective mode of operation). Nanowire 98 is configured such that the resistance of nanowire 98 varies based on values of different flow properties when nanowire 98 is operated in different modes of operation respectively. When nanowire 98 is alternated between two different modes of operation, two different flow properties are measured. The measurements are output to signal conditioner 56, and a compensation unit 100 (e.g., a compensation program or compensation circuitry) processes the output and uses the measurements of one of the flow properties to correct the measurements of the other flow property. Compensation unit 100 outputs corrected data 102 as well as compensating data 104. Connection 101 between alternating current 110 and compensation unit 100 synchronizes compensation unit 100 with alternating current 110.

For some applications, nanowire 98 is coupled to a leg 105 of Wheatstone bridge 106 in a CCA circuit 108 that alternates between driving nanowire 98 with a low current and a high current (e.g., between zero and a positive value). When low current is used, nanowire 98 remains cool and is sensitive to ambient temperature, thus measuring the temperature of the fluid. When high current is used, nanowire is heated and is sensitive to heat transfer from the surrounding environment, thus measuring the velocity of the fluid. For some applications, power source 22 alternates between the low and high current by using an alternating current 110 in the form of a square wave (such as is shown in FIG. 6), a triangle wave, or a sinusoidal wave. When using alternating current 110 to drive nanowire 98, the measurement frequency, at which the two different flow properties can be measured is typically less than half of the frequency of alternating current 110. For some applications, power source 22 drives nanowire 98 with an alternating current having a frequency of 1-2000 Hz, e.g., 1-100 Hz or 100-2000 Hz.

A nanowire operating at low current has a lower frequency response than when operating at a higher current. Therefore, the frequency response of nanowire 98 is limited by the value of the current in the low state of alternating current 110. In order increase the frequency response, alternating current 110 can be configured to alternate between two high currents that both heat nanowire 98, but to different degrees. In this case, instead of nanowire 98 being cool during a low state 111 of alternating current 110 and heated during a high state 113 state of alternating current 110, nanowire 98 is in a lower heated condition during low state 111 and a higher heated condition during high state 113. For example, nanowire 98 may be heated to 200 degrees Celsius during low state 111 of alternating current 110, and to 300 degrees Celsius during high state 113 of alternating current 110. In the higher heated condition, nanowire 98 is more sensitive to velocity and less sensitive to temperature, and in the lower heated condition, nanowire 98 is less sensitive to velocity and more sensitive to temperature. Both the temperature and velocity can be solved for by having both measurements and the wire calibration curves for both operating modes.

Figure 7:
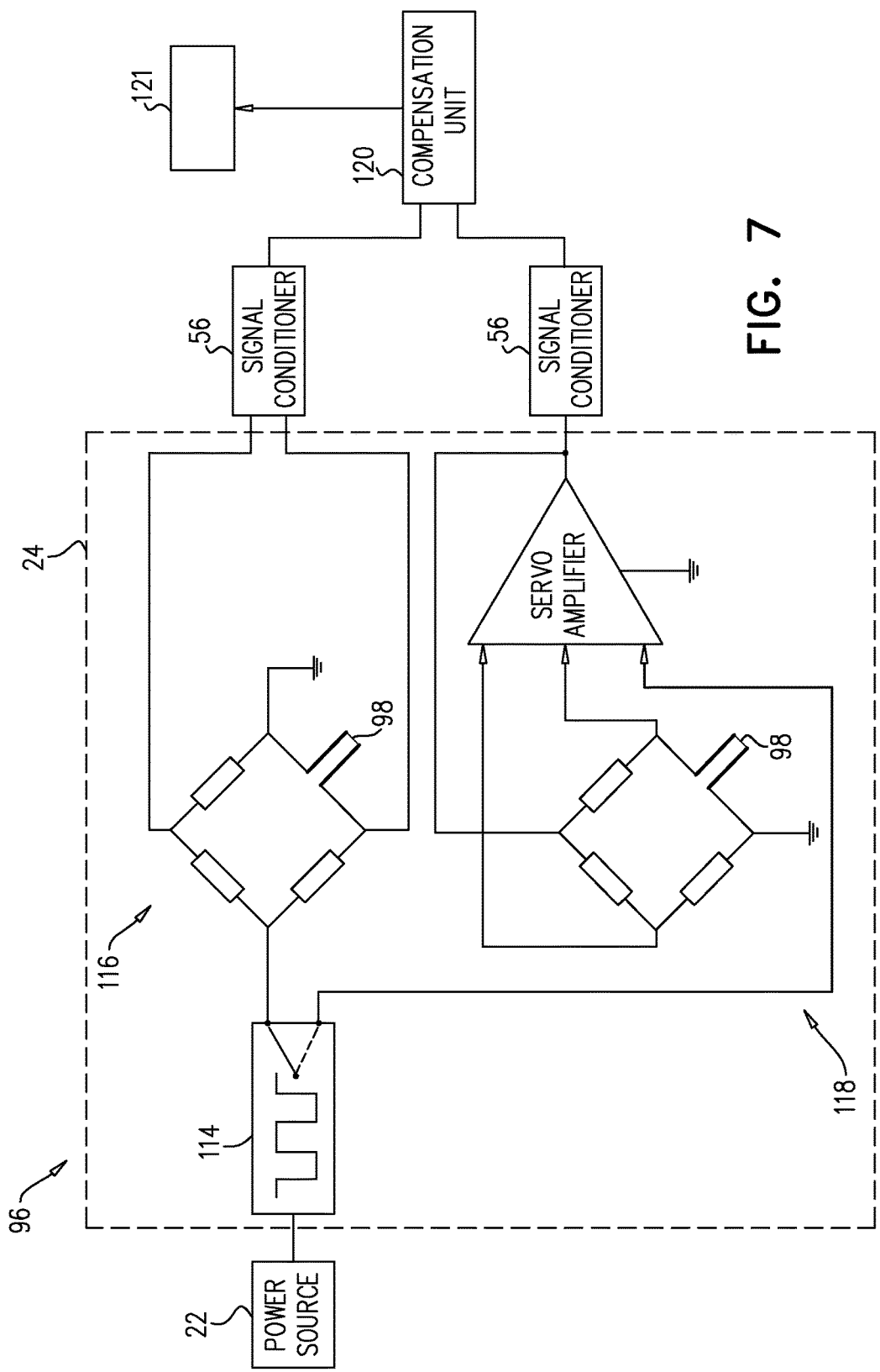
Figure 8:
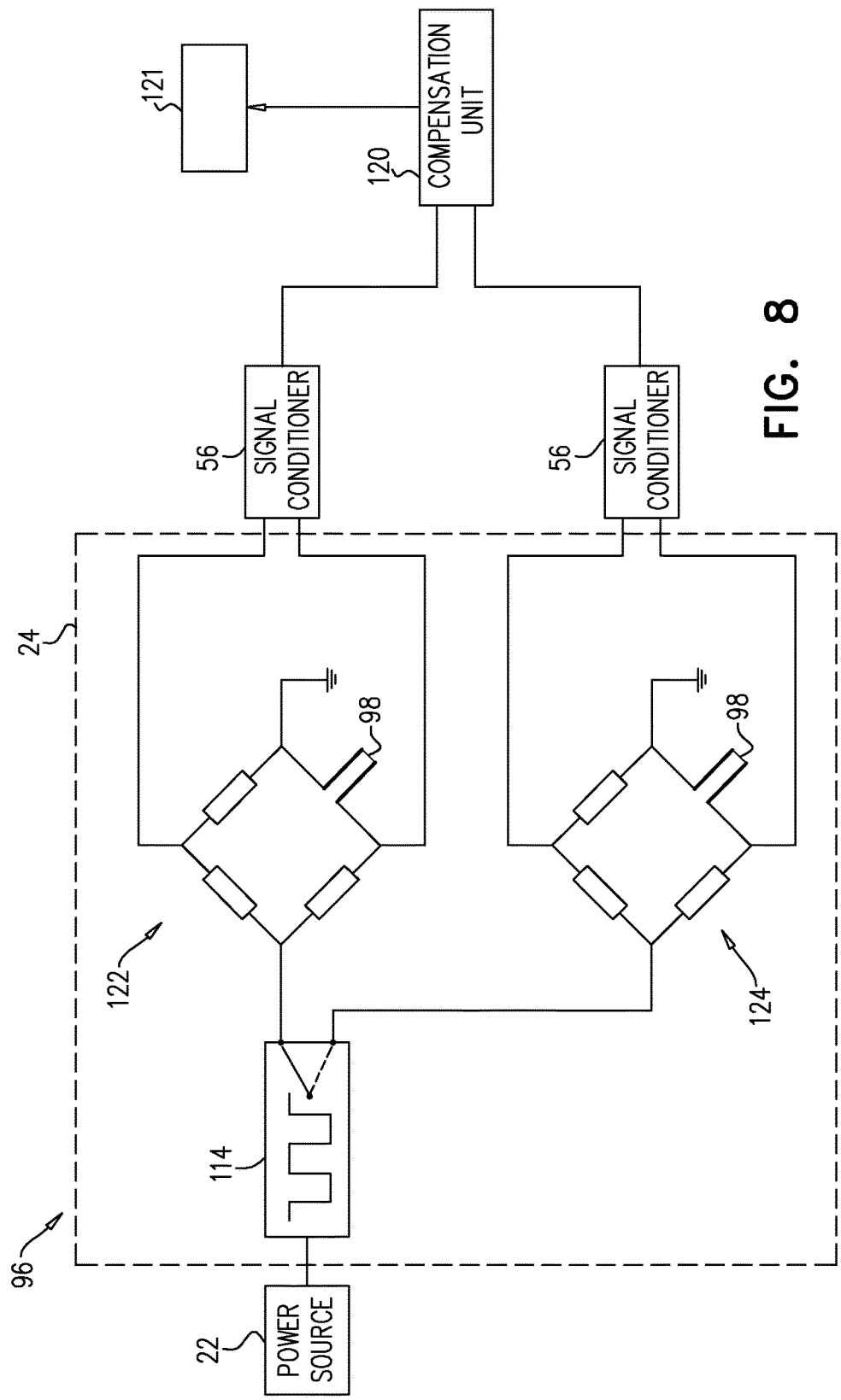

Reference is now made to FIGS. 7-8, which are schematic illustrations of sensing apparatus, such as sensing apparatus 96, in accordance with some applications of the present invention. For some applications, a switching circuit 114 is used to alternate nanowire 98 between two different modes of operation. For example, switching circuit 114 may be used to switch between operating nanowire 98 with CCA circuit 116 and operating nanowire 98 with CTA circuit 118. A compensation unit 120 (e.g., a compensation program or compensation circuitry) processes data output by nanowire 98 after the different flow properties have been measured, and outputs corrected data 121. For some applications, switching circuit 114 switches between operating the nanowire using two different CCA circuits 122 and 124, such as is shown in FIG. 8, that drive the nanowire with different respective currents. For example, first CCA circuit 122 drives the nanowire with a current of 5-50 mA and second CCA circuit 124 drives the nanowire with a current of 0.1-1 mA. Alternatively or additionally, first CCA circuit 122 drives the nanowire with a current which is 15-150 times the current driven by second CCA circuit 124 through the nanowire.

Various different practical applications may benefit from sensing apparatus such as the sensing apparatus described hereinabove. Some examples include, but are not limited to, drones, such as multicopters or fixed wing drones, aircraft in general, gas meters, and turbines.

Figure 9A:
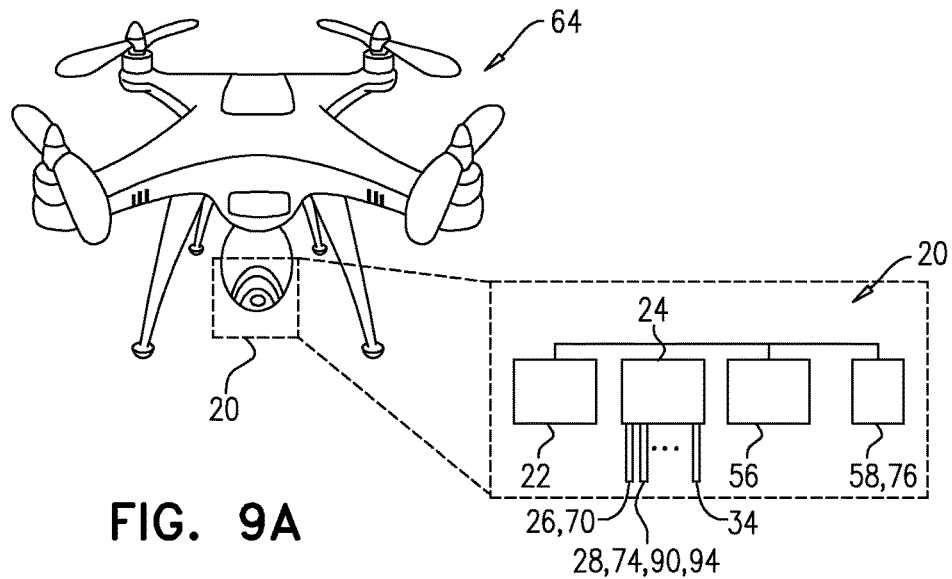
FIG. 9A is a schematic illustration of the sensing apparatus coupled to a multicopter, in accordance with some applications of the present invention.
Figure 9B:
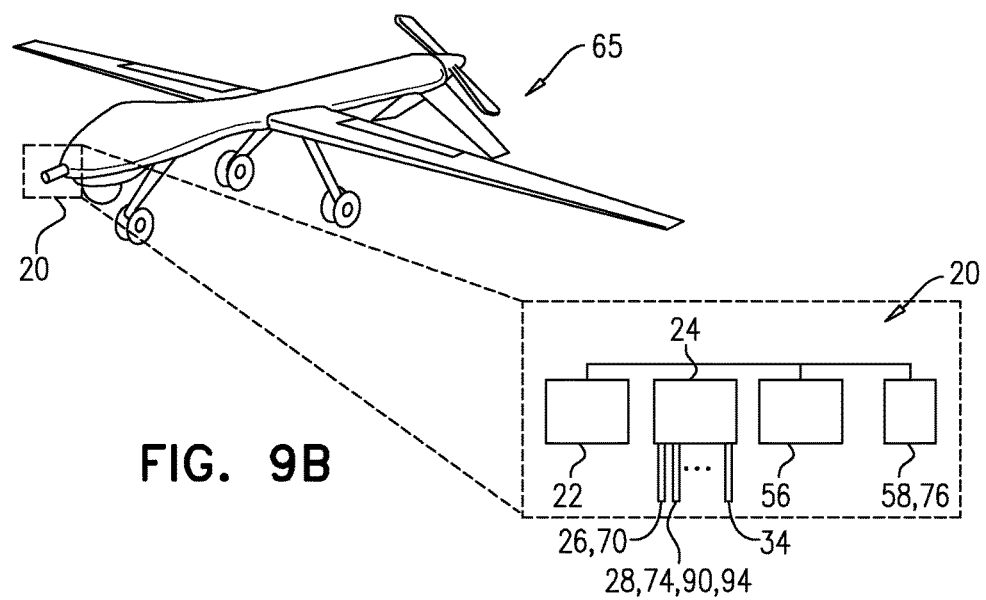
FIG. 9B is a schematic illustration of the sensing apparatus coupled to a fixed-wing drone, in accordance with some applications of the present invention.

Reference is now made to FIGS. 9A-B, which are schematic illustrations of sensing apparatus, such as sensing apparatus 20, coupled to a multicopter and a fixed-wing drone. For example, sensing apparatus 20 may be coupled to a nose or blade of multicopter 64 or a nose, wing, or tail of a fixed-wing drone 65. Sensing apparatus 20 then provides real-time feedback of different properties of the airflow during flight. It is noted that sensing apparatus where a single nanowire 98 is used to measure different flow properties, such as sensing apparatus 96, may be used for this application as well.

Figure 10:
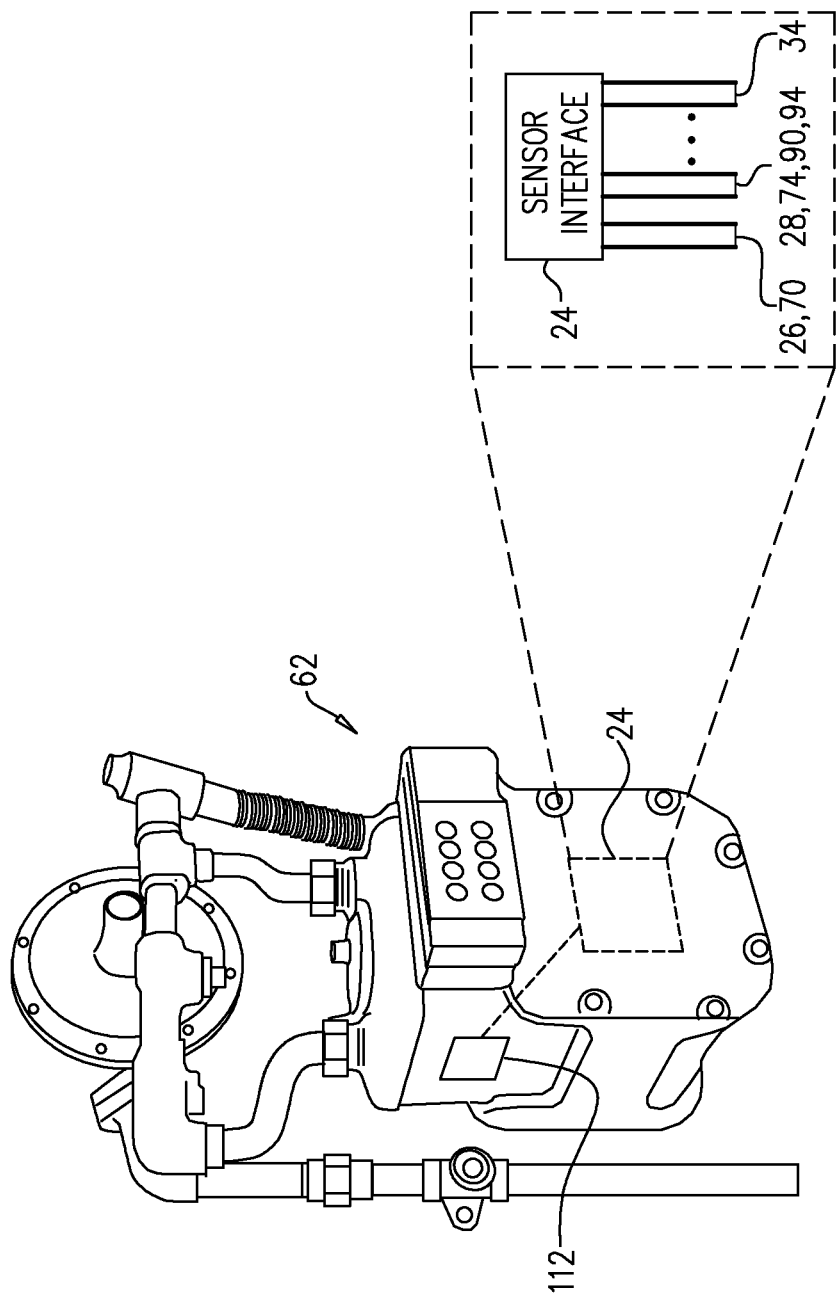
FIG. 10 is a schematic illustration of a gas meter with the sensing apparatus disposed within the gas meter, in accordance with some applications of the present invention.

Reference is now made to FIG. 10, which is a schematic illustration of sensing apparatus, such as sensing apparatus 20, disposed within gas meter 62. Sensor interface 24 may be disposed inside gas meter 62, and coupled to control circuitry 112, which includes the operating components, such as the power source, CCA/CTA circuits, signal conditioner, compensation unit, and output circuitry. It is noted that sensing apparatus where a single nanowire 98 is used to measure different flow properties, such as sensing apparatus 96, may be used for this application as well.

Figure 11:
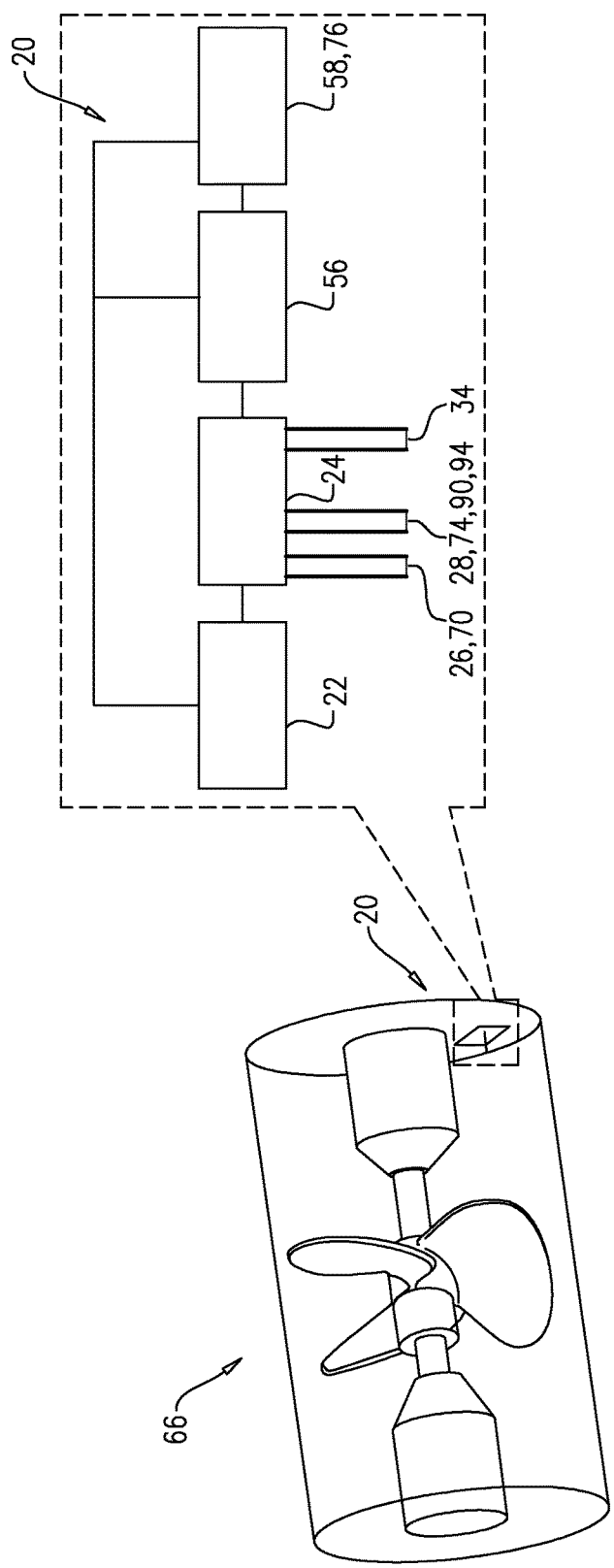
FIG. 11 is a schematic illustration of a turbine with the sensing apparatus disposed within the turbine, in accordance with some applications of the present invention.

Reference is now made to FIG. 11, which is a schematic illustration of sensing apparatus, such as sensing apparatus 20, disposed within a turbine. Sensing apparatus 20 may provide real-time feedback of flow properties within turbine 66. It is noted that sensing apparatus where a single nanowire 98 is used to measure different flow properties, such as sensing apparatus 96, may be used for this application as well.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for measuring at least two flow properties of a fluid, the method comprising:
   providing at least two nanowires, the resistance of each nanowire varying based on flow past the nanowire, such that each nanowire is configured to measure a different respective flow property;
   operating each of the nanowires in a different respective mode of operation, to measure the at least two flow properties simultaneously in real-time, the respective modes of operation selected from the group consisting of:
      (a) constant current anemometry (CCA) and constant temperature anemometry (CTA), and
      (b) CCA with a first CCA current in one of the nanowires, and CCA with a different CCA current in another one of the nanowires; and
   using a measurement obtained from at least one of the nanowires to correct a measurement obtained from at least another of the nanowires.

2. The method according to claim 1, wherein:
   providing the two nanowires comprises providing a temperature-measuring nanowire and a velocity-measuring nanowire, and
   using a measurement comprises using a temperature measurement obtained from the temperature-measuring nanowire to correct a velocity measurement obtained from the velocity-measuring nanowire.

3. The method according to claim 1, wherein operating comprises using an output measurement from a second one of the two nanowires to process measurement data output by a first one of the two nanowires.

4. The method according to claim 3, further comprising driving the first nanowire using first nanowire-driving circuitry and driving the second nanowire using second nanowire-driving circuitry.

5. The method according to claim 1, wherein providing at least two nanowires comprises providing at least two nanowires wherein a ratio of a width to a height of a cross-section of a first one of the at least two nanowires is 0.8-1.2 times a ratio of a width to a height of a cross-section of a second one of the at least two nanowires, the cross-sections being taken perpendicular to a direction of current flow in the first and second nanowires.

6. The method according to claim 1, wherein providing at least two nanowires comprises providing at least two nanowires having the same cross-sectional areas, the cross-sections being taken perpendicular to a direction of current flow in the nanowires.

7. A method for measuring different flow properties of a fluid, the method comprising:
   providing a nanowire, the resistance of the nanowire varying based on temperature changes of the nanowire that reflect values of the different flow properties of the fluid when the nanowire is operated in different modes of operation respectively, such that the nanowire is configured to measure different flow properties when operated in different modes of operation respectively;
   alternating the nanowire between two different modes of operation;
   measuring two different How properties of the fluid during the two different modes of operation, respectively; and
   using the measurements of one of the flow properties to correct the measurements of the other flow property,
      wherein alternating the nanowire between the two different modes of operation comprises driving the nanowire with an alternating current, and wherein measuring the two different flow properties of the fluid comprises measuring the two different flow properties at a measurement frequency of less than half of a frequency of the alternating current.

8. The method according to claim 7, wherein driving the nanowire with the alternating current comprises driving the nanowire with different respective levels of current.

* * * * *